United States Patent [19]
Eschenfelder

[11] Patent Number: 6,102,686
[45] Date of Patent: Aug. 15, 2000

[54] THERMOFORMING APPARATUS FOR PRINTED SUBSTRATE

[75] Inventor: Kurt F. Eschenfelder, West Bend, Wis.

[73] Assignee: Serigraph, Inc., West Bend, Wis.

[21] Appl. No.: 09/225,441

[22] Filed: Jan. 5, 1999

[51] Int. Cl.⁷ .................................................. B29C 51/10
[52] U.S. Cl. ...................... 425/388; 264/297.8; 264/551; 264/554; 425/397; 425/DIG. 48
[58] Field of Search ..................................... 425/384, 388, 425/DIG. 48, 397; 264/522, 554, 551, 297.5, 297.8, 327

[56] References Cited

U.S. PATENT DOCUMENTS

| | | | |
|---|---|---|---|
| 2,962,764 | 12/1960 | Trojanowski et al. | 264/297.8 |
| 3,253,069 | 5/1966 | Holley et al. | 264/554 |
| 3,461,504 | 8/1969 | Becker et al. | 264/327 |
| 3,483,284 | 12/1969 | Shelby | 264/551 |
| 3,600,753 | 8/1971 | Otto | 264/551 |
| 5,230,910 | 7/1993 | Eggert | 425/385 |
| 5,618,486 | 4/1997 | Yoshimi et al. | 264/321 |

*Primary Examiner*—Jan H. Silbaugh
*Assistant Examiner*—Dae Young Lee
*Attorney, Agent, or Firm*—Andrus, Sceales, Starke & Sawall

[57] ABSTRACT

A thermoforming method and apparatus is provided for a flat thin sheet plastic substrate having printed material thereon in the form of a matrix of a plurality of items. The substrate is clamped between a pair of clamp plates providing support for the substrate around the perimeter thereof and also in a matrix support pattern having a plurality of subperimeters providing individual support around the respective perimeter of each item. The assembly is heated, and then thermoformed into a contoured three dimensional workpiece by pushing a matrix of a plurality of tool faces into the substrate at respective items. The matrix support pattern of the clamp plates along the plurality of subperimeters prevents sagging across the substrate during heating, and isolates the items from each other during deformation of the substrate by the tool faces.

7 Claims, 5 Drawing Sheets

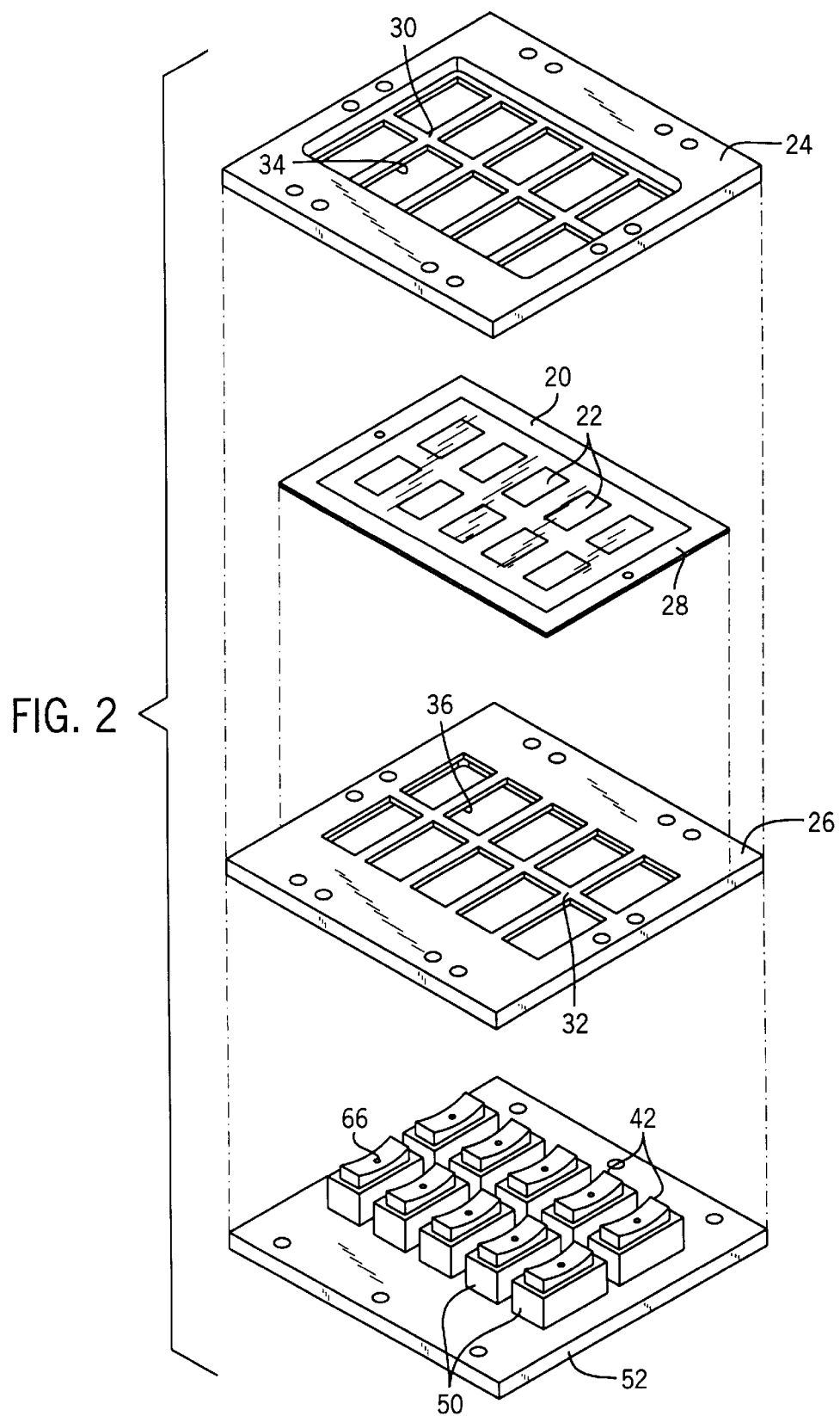

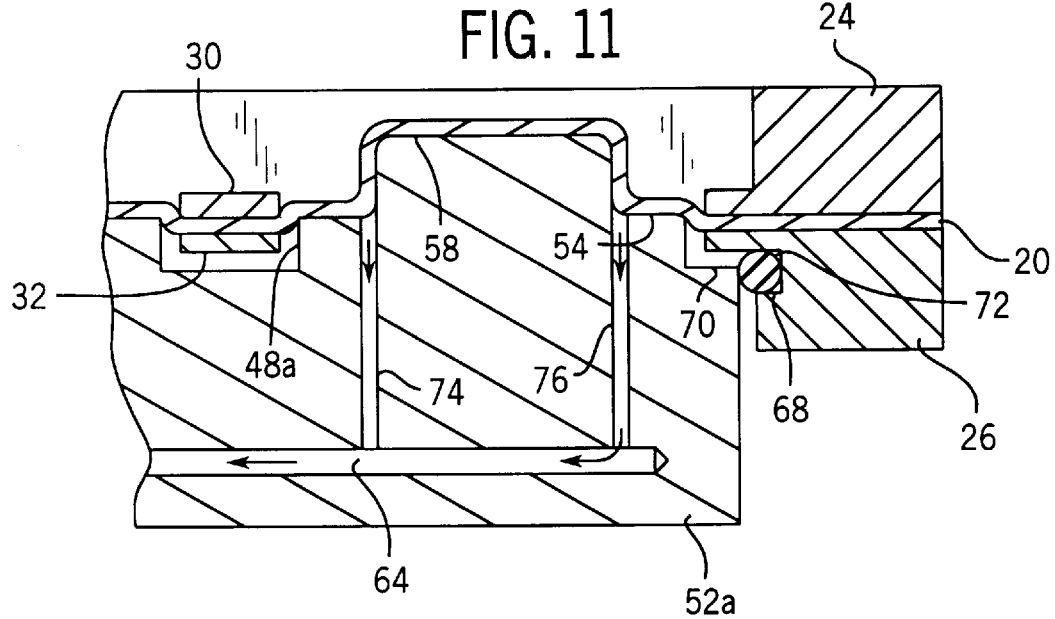

THERMOFORMING APPARATUS FOR PRINTED SUBSTRATE

BACKGROUND AND SUMMARY

The invention relates to a thermofonning method and apparatus for flat thin sheet plastic substrates having printed material thereon.

It is known in the prior art to clamp the printed substrate between a pair of clamp plates, then heat the substrate, and then thermoform same into a contoured three dimensional workpiece by pushing a tool face into the substrate far enough to allow the hot elastic plastic material to create a vacuum or pressure seal against the tooling, followed by application of vacuum or pressure to conform the plastic substrate to the shape of the tooling.

The present invention provides an improvement enabling higher throughput.

BRIEF DESCRIPTION OF THE DRAWINGS

FIG. 2 is an exploded perspective view of thermoforming apparatus in accordance with the invention.

FIG. 11 is a view like FIG. 4 and shows an alternate embodiment.

DETAILED DESCRIPTION OF THE INVENTION

Figure 1:
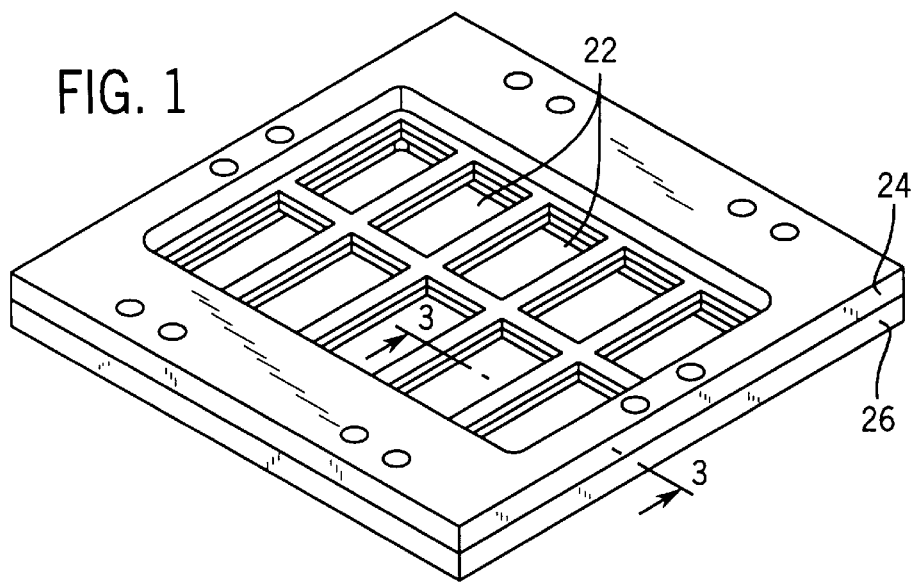
FIG. 1 is a perspective assembled view of clamp plates for thermoforming apparatus in accordance with the invention.
Figure 3:
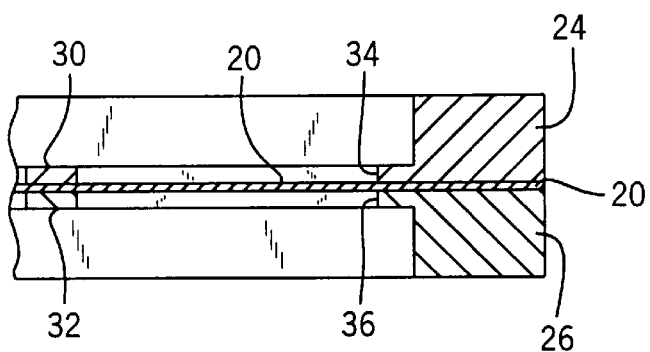
FIG. 3 is a sectional view taken along line 3—3 of FIG. 1.
Figure 5:
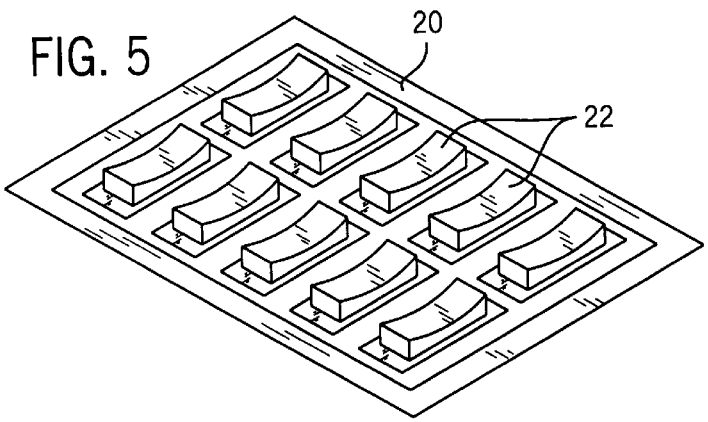
FIG. 5 is a perspective view of a printed substrate after thermoforming.
Figure 6:
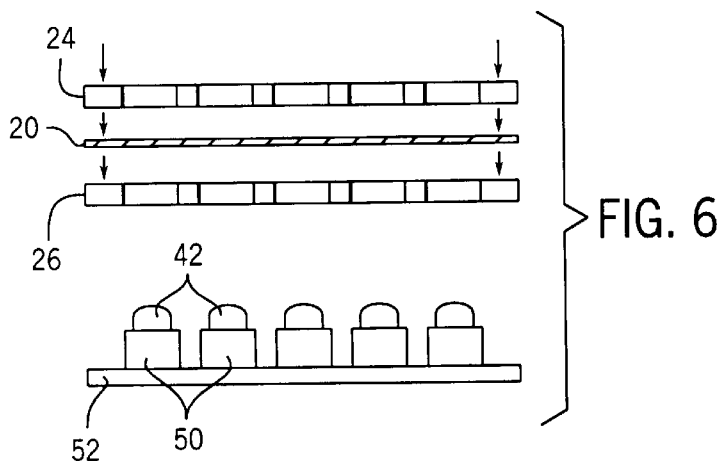
FIG. 6 is a schematic illustration showing a step in the thermoforming method.
Figure 7:
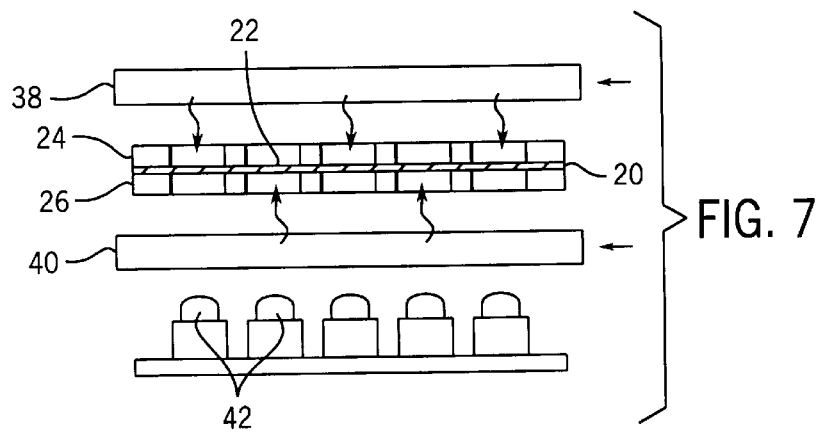
FIG. 7 is a schematic illustration showing a further step in the thermoforming method.

FIGS. 1 and 2 show thermoforming apparatus for heating and forming a contoured three dimensional workpiece as shown in FIG. 5 from a flat thin sheet plastic substrate 20, FIG. 2, having printed material thereon in the form of a matrix of a plurality of items 22. The substrate may be printed in various known manners, including screen printing, offset printing, roll coating, and other methods of applying a coating or layer. A pair of clamp plates 24 and 26 clamp substrate 20 therebetween and support the substrate around the perimeter 28 thereof. The clamp plates have a matrix support pattern 30, 32 formed by a plurality of openings providing a plurality of subperimeters 34, 36 providing individual support around the respective perimeter of each of items 22. The matrix support pattern of the clamp plates along the plurality of subperimeters 34, 36 prevents sagging across substrate 20 during heating, and also isolates items 22 from each other during forming into the contoured three dimensional workpiece.

Figure 8:
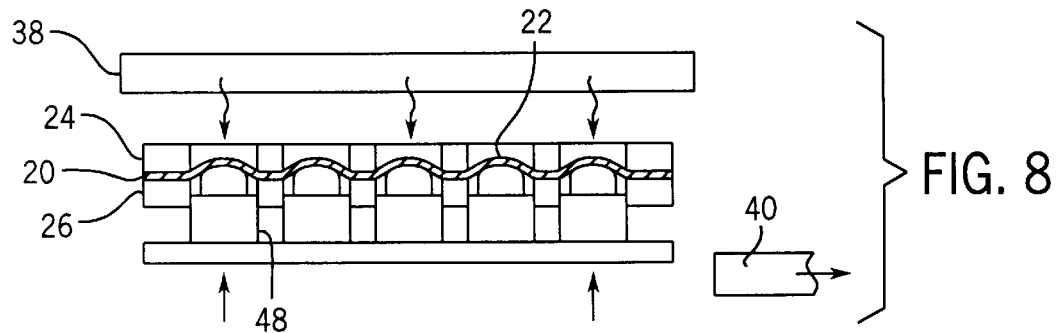
FIG. 8 is a schematic illustration showing a further step in the thermoforming method.
Figure 9:
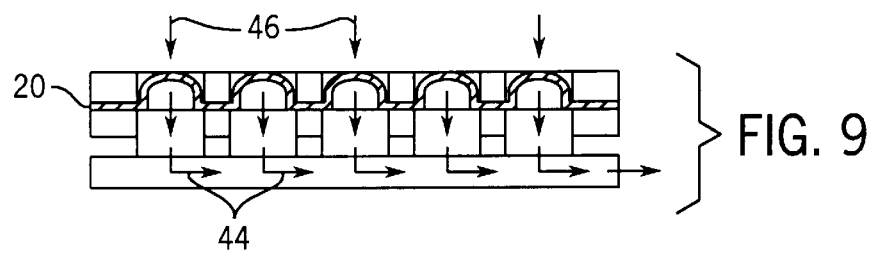
FIG. 9 is a schematic illustration showing a further step in the thermoforming method.
Figure 10:
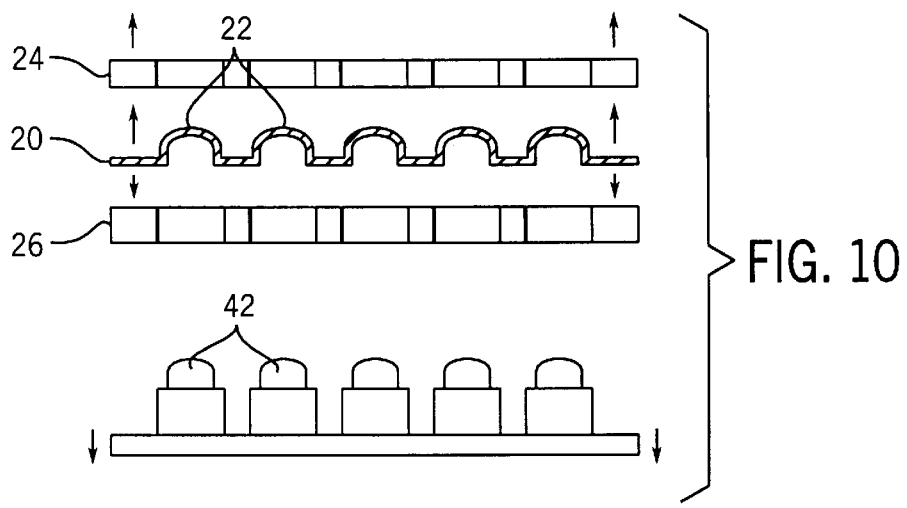
FIG. 10 is a schematic illustration showing a further step in the thermoforming method.

The substrate is clamped between the workpieces, FIGS. 1, 3, 6, 7, and then heated by top and/or bottom ovens 38, 40, and then thermoformed into a contoured three dimensional workpiece by pushing a matrix of a plurality of tool faces 42 into the substrate at respective items 22, FIG. 8, followed by application of vacuum as shown at arrows 44, FIG. 9, and/or pressure as shown at arrows 46, followed by lowering of tool faces 42 and release of clamp plates 24, 26, FIG. 10. The heated plastic substrate forms a vacuum pressure seal against the edges of the tooling, FIGS. 8 and 9, facilitating application of vacuum and/or pressure, FIG. 9, as is known.

The noted matrix support pattern is provided by the noted plurality of mating openings in the clamp plates, each opening defining a respective subperimeter 34, 36, etc., around a respective item. The matrix of tool faces 42 is pushed into the substrate, FIG. 8, by partially inserting the matrix support pattern of the clamp plates into clearance gaps 48, FIG. 8, of sufficient depth between the tool faces. The substrate is maintained uniplanar at the matrix support pattern 30, 32, of the clamp plates both before and after heating and both before and after deformation.

A plurality of riser blocks 50, FIG. 2, support tool faces 42 on a riser plate 52. Each riser block extends upwardly from riser plate 52 to a top surface 54, FIG. 4, having a perimeter 56. Each tool face 42 extends upwardly from top surface 54 to a top surface 58 having a perimeter 60. Perimeter 60 is smaller than perimeter 56. Clearance gaps 48 are provided between the riser blocks at top surfaces 54 between perimeters 56 and of sufficient depth to permit partial insertion of matrix support pattern 32 therebetween. The diameter of openings 36 is equal to the diameter of perimeter 56 plus a clearance factor to enable deformation and crimping of the substrate at 62, FIG. 4, to provided the noted vacuum seal at perimeter 56. Riser plate 52 has a vacuum supply passage 64 feeding vacuum passages 66 in the riser blocks.

Figure 4:
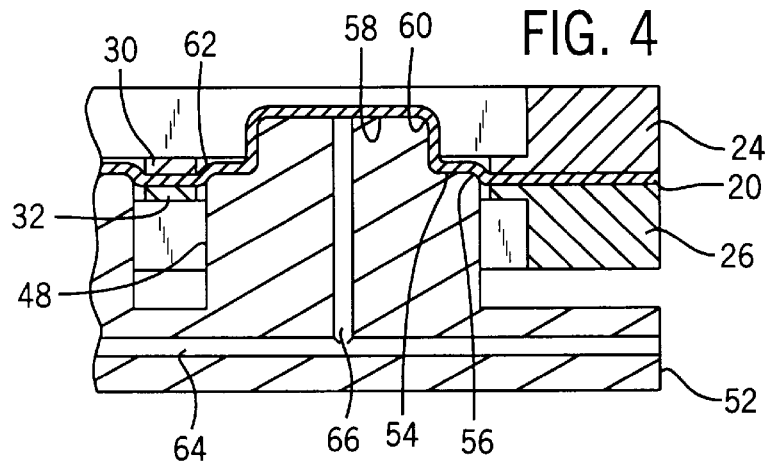
FIG. 4 is a sectional view of a portion of the assembled apparatus of FIG. 2.

FIG. 11 is similar to FIG. 4 and shows another embodiment and uses like reference numerals where appropriate to facilitate understanding. A vacuum tight sealing gasket provided by O-ring 68 is engaged between lower clamp plate 26 and riser plate 52a. Riser plate 52a has a greater height than riser plate 52 and extends upwardly to a top surface 70. The depth of gaps 48a between the tool faces in FIG. 11 is not as great as the depth of gaps 48 in FIG. 4, but is deep enough to permit the noted partial insertion of the matrix support pattern 32, 30, to facilitate the noted thermoforming. Adjacent O-ring sealing gasket 68 is retained in a groove 72 in clamp plate 26 and engages the riser plate adjacent top surface 70. Vacuum supply passage 64 supplies vacuum to vacuum passages 74 and 76.

After the above noted thermoforming, the workpiece shown in FIG. 5 is ready for further processing, and is particularly intended for in mold decorating with injection molding, as is known, and which does not form a part of the present invention. The workpiece in FIG. 5 is die cut into a plurality of pieces which are placed in a mold, followed by injection of molten plastic which fuses with the workpieces to form injection molded parts. Such in mold decorated parts have numerous uses, including graphic display functions on automotive instrument clusters, electrical switch faces such as rocker buttons, etc.

Substrate 20 may be printed to provide items 22 in separate areas of the substrate as shown in FIG. 2 at the separate rectangles, or the substrate may be printed with a single continuous layer of ink providing the respective items at respective areas. Graphics may be formed on the substrate during the printing and/or may be formed later, after the thermoforming and/or after the noted injection molding, for example by laser etching or the like as is known.

It is recognized that various equivalents, alternatives and modifications are possible within the scope of the appended claims.

What is claimed is:

1. Thermoforming apparatus for heating and forming a contoured three dimensional workpiece from a flat thin sheet plastic substrate having a border perimeter and having printed material thereon in the form of a matrix of a plurality of items, comprising a pair of clamp plates for clamping said substrate therebetween and supporting said substrate around said border perimeter thereof and also having a matrix support pattern comprising a plurality of subperimeters providing individual support around the respective subperimeter of each of said items, said matrix support pattern of said clamp plates along said plurality of subperimeters preventing sagging across said substrate during said heating and isolating said items from each other during said forming into said contoured three dimensional workpiece, said matrix support pattern comprising a plurality of openings in said clamp plates, each opening defining a respective said subperimeter around a respective said item; a matrix of a plurality of tool faces for pushing into said substrate at respective said items at respective said openings and providing the contour of the three dimensional workpiece; a plurality of riser blocks supporting said tool faces on a riser plate, each riser block extending upwardly from said riser plate to a first top surface for engaging said substrate and having a first perimeter, each tool face extending upwardly from said first top surface to a second top surface having a second perimeter smaller than said first perimeter; and comprising clearance gaps between said riser blocks at said first top surfaces between said first perimeters of sufficient depth to permit partial insertion of said matrix support pattern of said clamp plates therebetween, wherein, when said plurality of tool faces is pushed into said substrate, said substrate at said border perimeter thereof and at said matrix support pattern at the interface of said clamp plates along said subperimeters defines a first plane, said first top surfaces on said riser blocks define a second plane parallel to and offset from and spaced transversely from said first plane said second top surfaces on said tool faces define a third plane parallel to and spaced transversely from said second plane on the opposite side thereof from said first plane, and wherein said substrate is pinched between said riser blocks and said clamp plates along clearance gaps therebetween extending transversely between said first and second planes such that said substrate transitions between said first and second offset planes transversely through said clearance gaps and is engaged on both sides thereof transversely to said first and second planes, said riser blocks engaging one transversely extending side of said substrate in said clearance gaps, one of said clamp plates engaging the other transversely extending side of said substrate in said clearance gaps.

2. The invention according to claim 1 comprising a vacuum tight sealing gasket engaged between one of said clamp plates and said riser plate and providing a seal around said perimeter of said substrate.

3. The invention according to claim 1 wherein said riser plate extends upwardly to a third top surface, and wherein each riser block extends upwardly from said third top surface, and comprising a vacuum tight sealing gasket engaged between one of said clamp plates and said riser plate adjacent said third top surface.

4. The invention according to claim 1 wherein said substrate at said matrix support pattern of said clamp plates is uniplanar both before and after said heating and both before and after said forming.

5. The invention according to claim 1 wherein the width of said clearance gap is substantially the thickness of said substrate.

6. The invention according to claim 5 wherein the transverse spacing between said first and second planes is only slightly greater than the thickness of said substrate.

7. The invention according to claim 5 wherein the transverse spacing between said second and third planes is substantially greater than the transverse spacing between said first and second planes.

* * * * *